United States Patent
Shi et al.

(10) Patent No.: US 6,353,511 B1
(45) Date of Patent: Mar. 5, 2002

(54) THIN FILM WRITE HEAD FOR IMPROVED HIGH SPEED AND HIGH DENSITY RECORDING

(75) Inventors: Zhupei Shi, San Jose; Lien-Chang Wang, Fremont; Bill Crue, San Jose; Yingjian Chen; Syed Hossain, both of Fremont, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/335,155

(22) Filed: Jun. 15, 1999

(51) Int. Cl.[7] .................................................. G11B 5/31
(52) U.S. Cl. ....................................................... 360/126
(58) Field of Search .......................................... 360/126

(56) References Cited

U.S. PATENT DOCUMENTS

| | | |
|---|---|---|
| 4,295,173 A | 10/1981 | Romankiw et al. |
| 4,636,897 A | 1/1987 | Nakamura et al. |
| 4,853,815 A | 8/1989 | Diepers |
| 4,884,157 A | 11/1989 | Roberts et al. |
| 5,032,945 A | 7/1991 | Argyle et al. |
| 5,057,380 A | 10/1991 | Hayashi et al. |
| 5,113,300 A | 5/1992 | Ikeda et al. |
| 5,134,535 A | 7/1992 | Mallary |
| 5,224,002 A | 6/1993 | Nakashima et al. |
| 5,274,521 A | 12/1993 | Miyauchi et al. |
| 5,289,628 A | 3/1994 | Omata et al. |
| 5,570,251 A | 10/1996 | Shinoura et al. |
| 5,571,573 A | 11/1996 | Shukovsky et al. |
| 5,590,008 A | 12/1996 | Tanabe et al. |
| 5,614,329 A | 3/1997 | Shimizu et al. |
| 5,639,509 A | 6/1997 | Schemmel |
| 5,702,756 A | 12/1997 | McKean et al. |
| 5,703,740 A | 12/1997 | Cohen et al. |
| 5,751,526 A | 5/1998 | Schemmel |
| 5,774,308 A | 6/1998 | Ohtsuka et al. |
| 5,828,530 A | 10/1998 | Gill et al. |
| 5,830,587 A | 11/1998 | Shukovsky et al. |
| 5,995,342 A * | 11/1999 | Cohn et al. .................. 360/126 |
| 6,001,468 A * | 12/1999 | Tagawa ....................... 360/126 |

* cited by examiner

Primary Examiner—Robert S. Tupper (57) ABSTRACT

A preferred embodiment provides a thin film write head having upper and lower pole structures each having pedestal pole tips formed with CoNiFe. The pedestal pole tips may have from about 60% to about 70% Co and from about 10% to about 15% Ni. The upper pole structure of the preferred embodiment has a laminated yoke portion having upper and lower layers. The lower layer is stitched to the pedestal pole tip of the upper pole structure and comprises FeXN, where X is selected from the group consisting of Rh, Ta, Hf, Al, Zr, Ti, Ru, Si, Cr, V, Si, Sr, Nb, Mo, Ru, and Pd. The upper layer comprises NiFe preferably having from about 15% to about 55% of Fe. It is preferred to define the lower layer of the yoke by etching FeXN material using the upper layer as a hard mask. In a preferred method and embodiment, the top surfaces of the conductor coil and the upper pedestal pole tip are planarized with an inorganic capping layer formed thereover to insulate the conductor coil from the yoke and to provide a low apex angle to form the yoke over.

11 Claims, 6 Drawing Sheets

THIN FILM WRITE HEAD FOR IMPROVED HIGH SPEED AND HIGH DENSITY RECORDING

BACKGROUND

Data is stored on magnetic media by writing on the magnetic media using a write head. Magnetic media can be formed in any number of ways, such as tape, stripe, floppy diskette, and hard disk. Writing involves storing a data bit by utilizing magnetic flux to set the magnetic moment of a particular area on the magnetic media. The state of the magnetic moment or bit transition is later read, using a read head, to retrieve the stored information.

An important goal of the magnetic storage industry is to improve data density. Data density is determined by the amount of data stored on an area of magnetic media and depends on how much area must be allocated to each bit. Both track density, a measure of how closely the tracks are spaced, and linear density, a measure of how closely the bits are spaced along the track, determine the overall data density.

To improve data density, reduced size write head structures and high coercivity media are used. A typical write head such as disclosed in U.S. Pat. No. 5,452,164, by Cole et al., entitled THIN FILM MAGNETIC WRITE HEAD, issued Sept. 19, 1995, herein incorporated by reference in its entirety, employs pedestal poles tips to improve track density. Furthermore, to improve linear density, bits are spaced closer together. Higher linear density, though, necessitates higher data rates. Thus, the rate that data is stored to the media also is an important measure of the operational performance of the write head.

The data rate is determined by the characteristics of the materials and the structure of the write head. In some stitched pole writers, the pole tips are made of FeNi with 35%–55% Fe so that the pedestal pole tips can supply the increased flux necessary to set bits on the high coercivity media.

Figure 1:
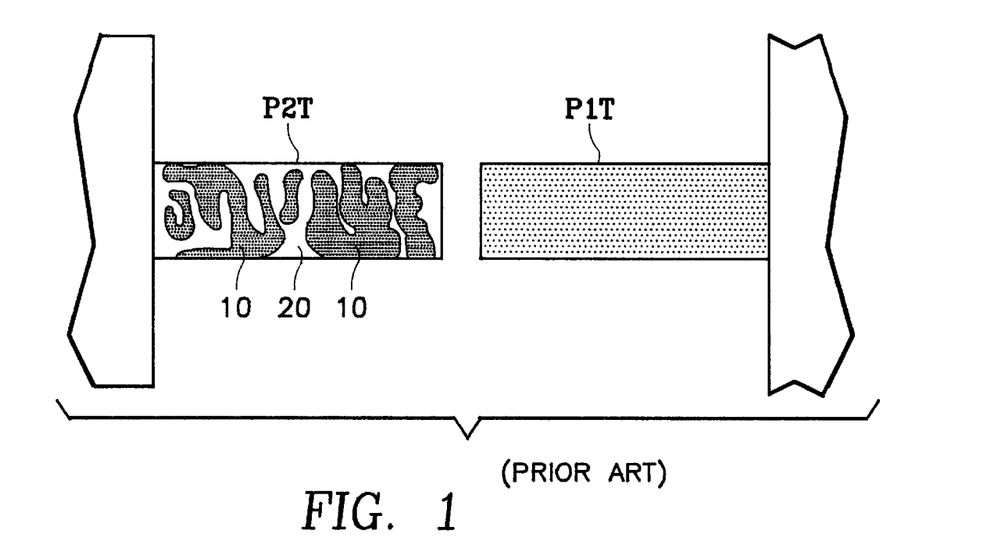
FIG. 1 is an air bearing surface view of upper and lower pedestal pole tips.

Using FeNi with 35%–55% Fe, however, has been observed by the present inventors to cause stripe domains 10 & 20 to form in the pedestal pole tips as illustrated in FIG. 1. FIG. 1 is a view from the air bearing surface showing longitudinal stripe domains 10 & 20, which form in an FeNi upper pedestal pole tip P2T having 45% Fe, during operation. The stripe domains 10 & 20 represent magnetic moments facing in and out of the page, respectively, as detected by a magnetic force microscope. By comparison, the lower pedestal pole tip P1T, formed of permalloy, shows magnetization domain states in the plane of the paper. These longitudinal stripe domain patterns largely degrade write head efficiency and cause a degradation of the Non Linear Transition Shift or NLTS, a key write performance parameter, at higher linear density.

What is needed is a writer with improved performance at high data density and high data rate.

SUMMARY

A preferred embodiment of the present invention provides a thin film write head having upper and lower pole structures each having pedestal pole tips formed with CoNiFe. In a preferred embodiment, the pedestal pole tip of the upper pole structure and the pedestal pole tip of the lower pole structure comprises from about 60% to about 70% Co and from about 10% to about 15% Ni. High $B_{sat}$ CoNiFe provides high flux across the write gap necessary for writing to high coercivity media, thus allowing for high data density. In addition, it provides low magnetostriction to inhibit stripe domains and "popcorn noise".

The upper pole structure of the preferred embodiment of the present invention has a laminated yoke portion having upper and lower layers. The lower layer is stitched to the pedestal pole tip of the upper pole structure and comprises FeXN, where X is selected from the group consisting of Rh, Ta, Hf, Al, Zr, Ti, Ru, Si, Cr, V, Si, Sr, Nb, Mo, Ru, and Pd. FeXN has a faster rise time and a better damping constant. As such, FeXN may provide a shorter exchange rate or magnetization rotation time, which allows for higher data rates.

The upper layer comprises NiFe preferably having from about 15% to about 55% of Fe. With the preferred embodiments and methods, the lower layer of the yoke is defined by etching FeXN material using the upper layer as a hard mask. The upper pole structure and method of the present invention allows for improved geometries and process control.

In a preferred method and embodiment, the top surfaces of the conductor coil and the upper pedestal pole tip are planarized and an inorganic capping layer formed over the planar surface. The inorganic capping layer may be used to insulate the conductor coil from the yoke and to provide a low apex angle to form the yoke over.

DESCRIPTION OF PREFERRED EMBODIMENTS AND METHODS OF THE PRESENT INVENTION

Figure 2:
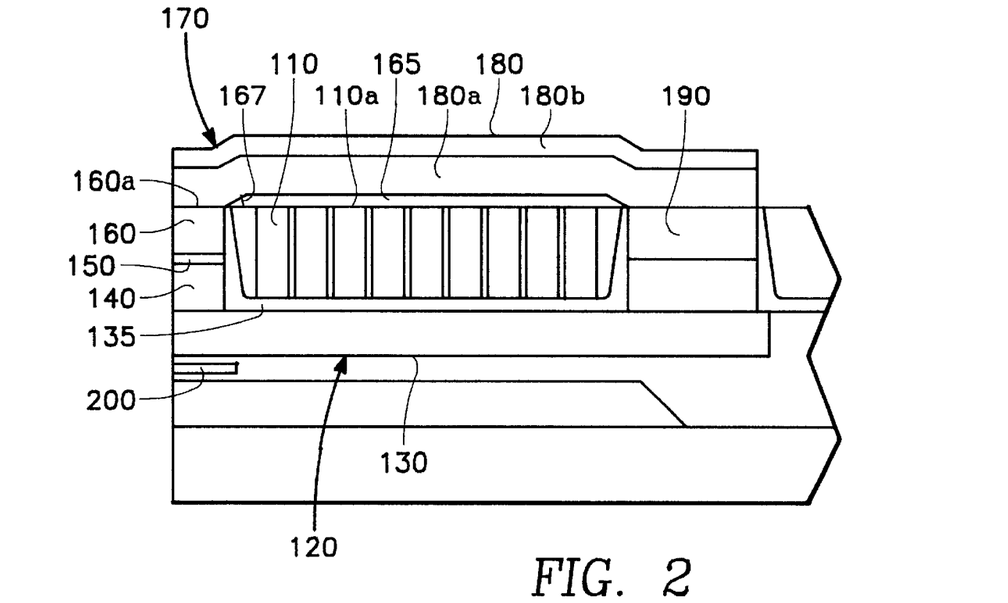
FIG. 2 is cross-sectional side view of a preferred embodiment in accordance with the present invention.

In the preferred embodiments of the present invention, the combination of pole geometry, coil architecture, and material selection provides improved high speed and high density magnetic recording. FIG. 2 shows a cross section of a preferred embodiment of the thin film write head of the present invention. The preferred embodiments have upper and lower pole structures 170 & 120 each having yoke structures 180 & 130 and upper and lower pedestal pole tips 160 & 140, respectively.

In the preferred embodiment of the FIG. 2, a single layer coil 110 is inset adjacent the upper and lower pedestal pole tips 140 & 160 so that an upper surface 110a of the conductor coil is approximately level with the upper surface 160a of the upper pedestal pole 160. The coil 110 is formed on an insulation layer 135. A capping insulation layer 165 is formed on the conductor coil to insulate the upper yoke from the conductor coil 110. Preferably the thickness of the capping layer 165 is minimized to reduce stack height and apex angle 167 while preventing shorting between the coil 110 and the upper pole structure 170. Preferably, the insulation layer 135 and the capping layer 165 are formed of an inorganic insulation to allow for reduced stack height. In some embodiments, the insulation layer 135 and the capping layer 165 may be formed of $SiO_2$, Alumina, or the like. In other embodiments, although not preferred, it is possible to use cured photoresist for the insulation and capping layers 135 & 165.

The preferred embodiments of the present invention provide a low stack height which reduces flux path distance through the upper yoke 170, thus and allowing smaller flux rise time. Furthermore the reduced stack height allows high moment materials, which do not perform well when sputtered on steep sloping surfaces, to be deposited over a lower apex angle 167.

In the preferred embodiment of FIG. 2, the upper and lower pole tips 160 & 140 are formed of high $B_{sat}$ CoNiFe. High $B_{sat}$ CoNiFe provides high flux across the write gap 150 to write to high coercivity media, thus allowing for high data density.

In addition, pedestal pole tips 160 & 140 of the preferred embodiments are formed with low magnetostriction $\lambda_s$ to inhibit stripe domains. Stripe domains degrade high data rate performance. Stripe domains can form in conventional pedestal pole tips, such as NiFe45% and NiFe55% which have $\lambda_s$ of about $30\times10^{-6}$ and $20\times10^{-6}$, respectively. Using high $B_{sat}$ material with lower magnetostriction $\lambda_s$ allows data rates to improve.

Furthermore, the pedestal pole tips 160 & 140 of the preferred embodiments also inhibit magnetostriction "popcorn noise", which can be generated by conventional pedestal pole tip materials. Popcorn noise, small magnetic disturbances created by magnetostriction forces detectible by a read sensor 200, can degrade performance and reduce yields of merged head devices.

In the preferred embodiments of the present invention, the upper and lower pole tips 160 & 140 may have about 60% to 70% Co and about 10% to about 15% of Ni. In one preferred embodiment $Co_{65}Ni_{13}Fe_{22}$ is used for pole tip 160 & 140 to optimize performance. In some embodiments of the present invention, the yoke portion 130 of the lower pole structure 130 may be formed of permalloy.

Figure 3:
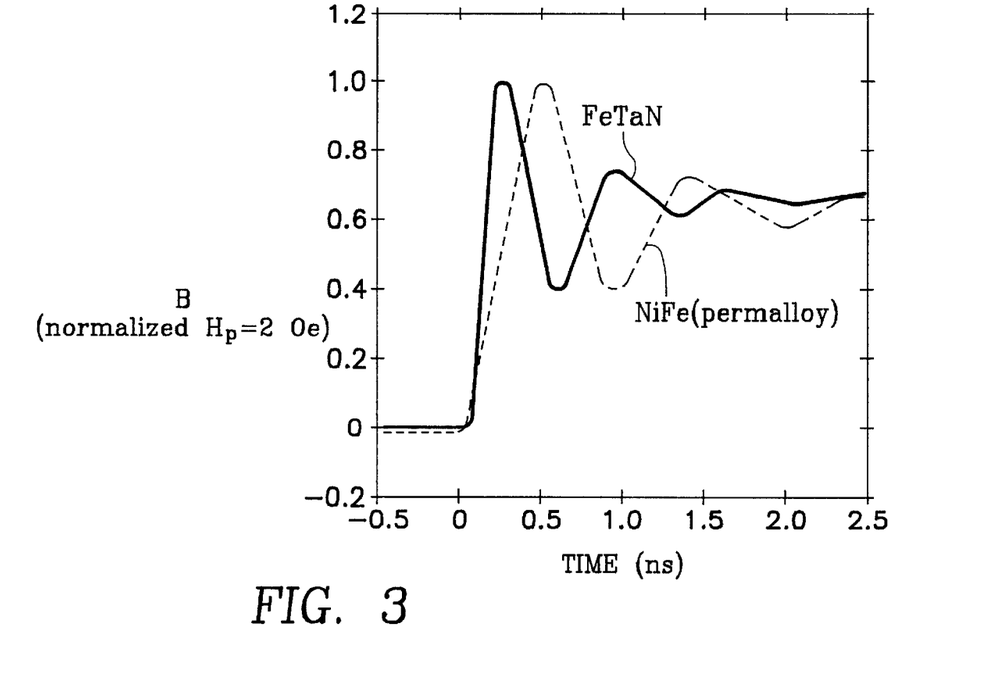
FIG. 3 is a graphical illustration of empirical data showing a comparison of flux rise time and damping in FeTaN and NiFe.

The yoke portion 180 of the upper pole structure 170 is preferably formed of a laminate of FeXN and NiFe. FeXN materials have a large magnetic damping constant. FIG. 3 shows a graph comparing the magnetic damping constant of FeTaN and permalloy. As shown in FIG. 3, FeTaN has a faster rise time and better damping constant than permalloy. As such, FeTaN provides a shorter exchange rate or magnetization rotation time, which allows for higher data rates.

Further, FeXN material is also preferred over CoNiFe for yoke material because of its higher resistivity and faster flux rise time. Higher resistivity material reduces eddy current loss, which is of particular concern in the yoke portion 180. In furtherance of this, some embodiments may be fabricated in accordance with U.S. patent application Ser. No. 09/315,863, by Chen et al., entitled HIGH RESISTIVITY FeXN SPUTTERED FILMS FOR MAGNETIC STORAGE DEVICES AND METHOD OF FABRICATION, filed on May 20, 1999, herein incorporated by reference in its entirety.

One advantage of the laminate structure of the upper yoke 180 is that it allows for improved structures and process control. It is difficult to deposit small FeXN structures because FeXN normally is deposited by sputtering rather than by plating. To overcome this in the preferred embodiment, a top seed layer, such as NiFe is deposited within a resist mask over an FeXN layer. The resist mask is removed and the NiFe is used as a hard mask during ion milling to define the pole structure of the underlying FeXN layer. This improves process control and allows for a more narrow upper yoke 170, which may be desirable in some embodiments, particularly at or near the upper yoke-to-pedestal pole tip stitch. As such, in one embodiment, the writer may be fabricated in accordance with the disclosure of U.S. patent application Ser. No. 09/326,904 by Shi et al., entitled STITCH-POLE THIN FILM WRITE HEAD FOR HIGH DENSITY MAGNETIC RECORDING, filed on Jun. 7, 1999, herein incorporated by reference in its entirety.

Another advantage of this is that the hard mask need not be removed, as would a photoresist mask, and it can provide additional flux capacity for the yoke 180. As such, NiFe with from about 15% to about 55% Fe, may be used as the second yoke layer 180b.

Furthermore, the laminate structure also can contribute to reducing eddy current loss, in some embodiments, as disclosed in U.S. patent application Ser. No. 09/192,388, by Chen et al., entitled, THIN FILM WRITE HEAD WITH IMPROVED LAMINATED FLUX CARRYING STRUCTURE AND METHOD OF FABRICATION, filed on Nov. 13, 1998, issued as U.S. Pat. Ser. No. 6,233,116, on May 15, 2001, herein incorporated by reference in its entirety.

Figure 4:
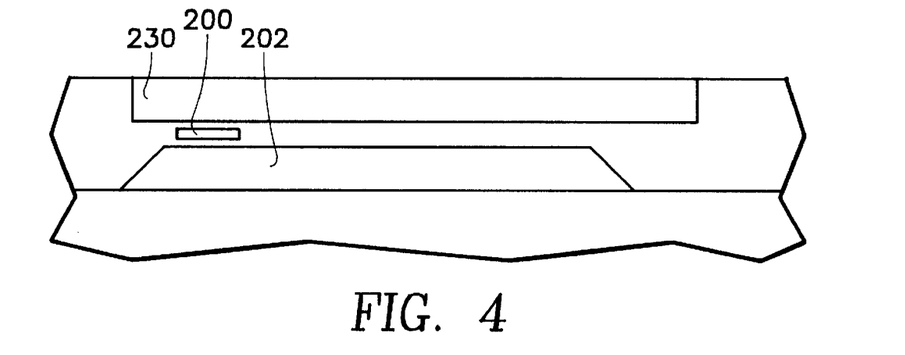
FIG. 4 is a cross-sectional side view of a partially fabricated thin film merged head in accordance with the present invention.

Turning to FIGS. 4–13, in a preferred method of fabricating a preferred embodiment of the present invention, the write head is formed as part of merged read and write head. Referring to FIG. 4, the write head may be formed over a first shield material 202 and a read element 200. The second shield material 230 may be planarized, such as by chemical mechanical polish, and will form the yoke portion 130 of the lower pole structure 120 of the write head of FIG. 2. As discussed above, the second shield 230, which will form lower yoke 130, is preferably formed of permalloy, but may be formed of other materials as is known in the art.

Figure 5:
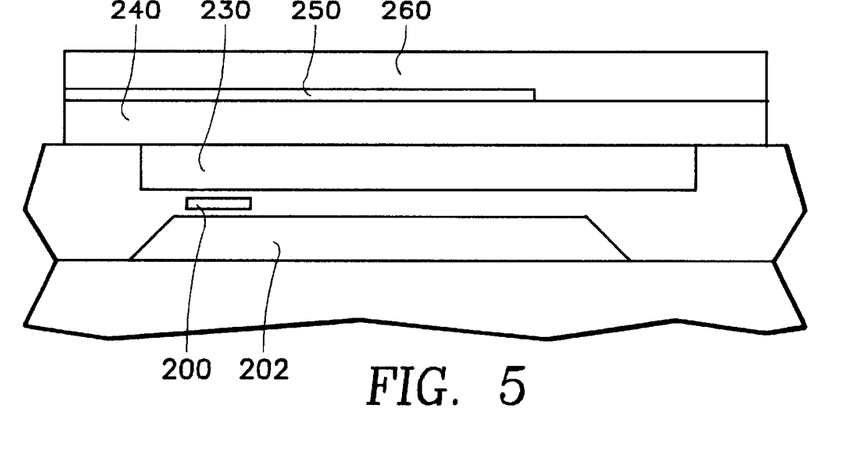
FIG. 5 is a cross-sectional side view of a partially fabricated thin film merged head in accordance with the present invention.

Referring to FIG. 5, high $B_{sat}$ CoNiFe, such as $Co_{65}Ni_{13}Fe_{22}$, may be deposited over the lower yoke material 230, such as by plating to form layers 240 and 260. $Co_{65}Ni_{13}Fe_{22}$ provides a $B_s$ of about 21K Gauss, and a magnetostriction $\lambda_s$ of about $2\times10^{-6}$, which is an order of magnitude lower than NiFe45% or NiFe 55%. In addition, the magnetostriction As is the same order of magnitude as permalloy, which is about $-3\times10^{-6}$. This inhibits generation of "popcorn noise" by the combined structure of the lower pedestal pole tip and lower yoke. A write gap layer 250 is deposited between the layers 240 and 260. In the preferred embodiment, layers 240 and define the back gap 190 without the write gap layer 250 between, as shown in FIG. 2.

Figure 6:
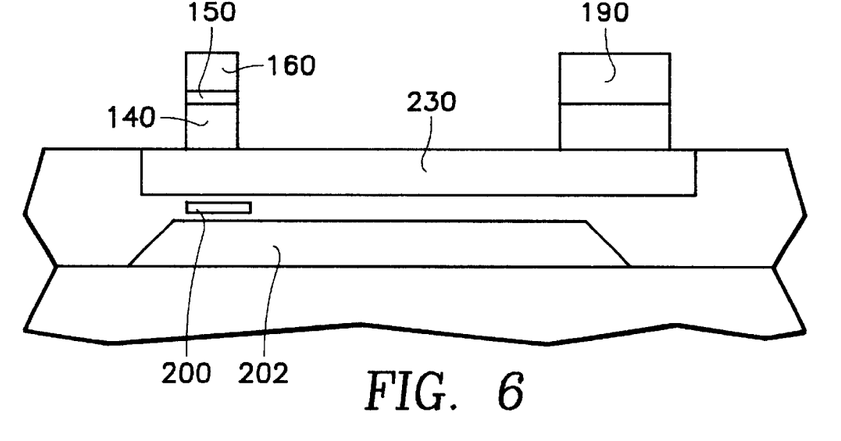
FIG. 6 is a cross-sectional side view of a partially fabricated thin film merged head in accordance with the present invention.

The layers 240–260 are etched, using a photoresist mask and milling techniques known in the art, to define the trackwidth of the upper and lower pedestal pole tips 160 & 140 and to define the back gap 190, as shown in FIG. 6. Although other methods to form the upper and lower pedestal pole tips 160 & 140 are possible, it is preferred to use a self-align process to define the upper and lower pedestal pole tips 160 & 140.

Figure 7:
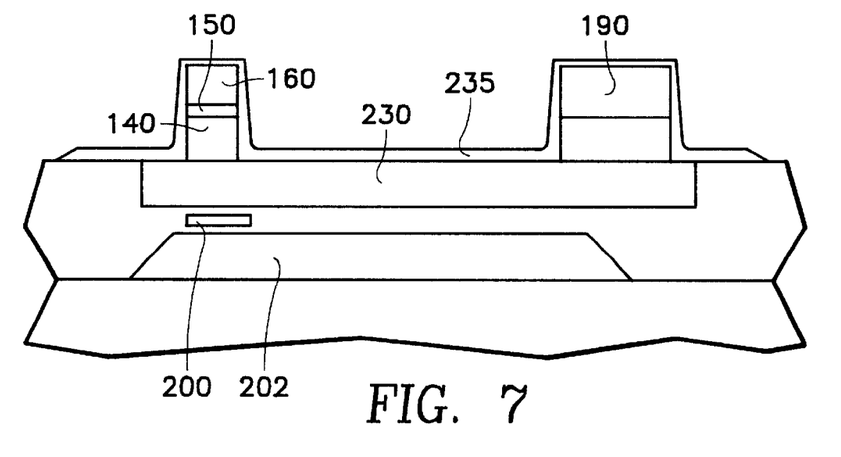
FIG. 7 is a cross-sectional side view of a partially fabricated thin film merged head in accordance with the present invention.

Referring to FIG. 7, an insulation layer 235 is deposited on the lower yoke structure layer 230. In the preferred method and embodiments, an inorganic insulation, such as alumina, $SiO_2$ or the like, may be used to form insulation layer 235. It also is possible to use an organic insulation, such as cured photoresist, to form the insulation layer 235. Although shown in the embodiment and method of FIG. 7 extending over the pedestal pole tips 160 & 140 and the back gap, it is possible in some embodiments and methods of the present invention, to limit its coverage by proper masking an exposure, so that this is not the case.

Figure 8:
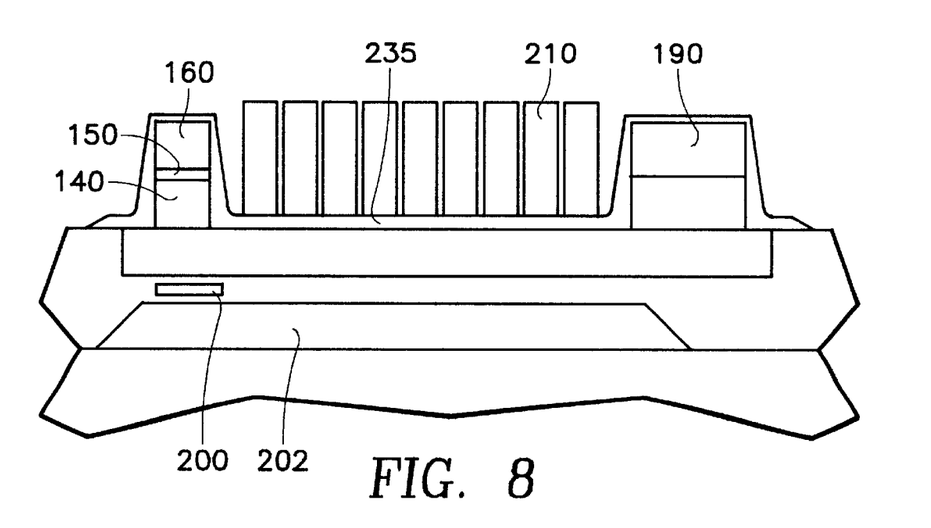
FIG. 8 is a cross-sectional side view of a partially fabricated thin film merged head in accordance with the present invention.

Referring to FIG. 8, a coil structure is formed within pole tip structures 160 & 140 and the back gap 190 to form the conductor winding 210 by masking and plating. In one preferred method, this may be accomplished by depositing a conductor seed layer, forming a photoresist mask, plating conductor material, removing the photoresist mask, and dry or wet etching to remove the conductor seed material to define the turns of the coil 210.

Figure 9:
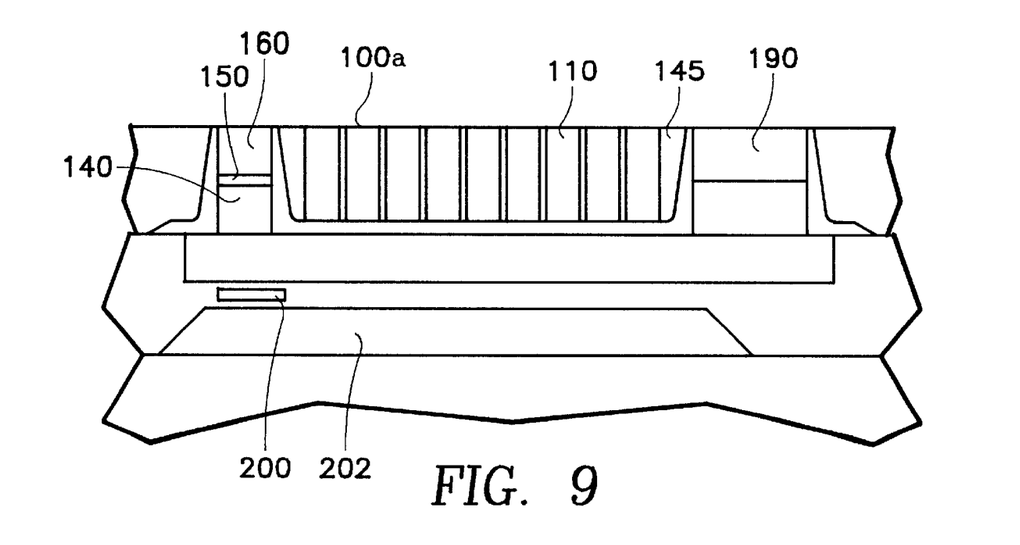
FIG. 9 is a cross-sectional side view of a partially fabricated thin film merged head in accordance with the present invention.

Referring to FIG. 9, a middle coat insulation layer may be deposited and the surface planarized, such as by chemical mechanical polish, to expose the upper pedestal pole tip 160 and the back gap 190. The top surface 110a of the coil structure 110 also is planarized.

Figure 10:
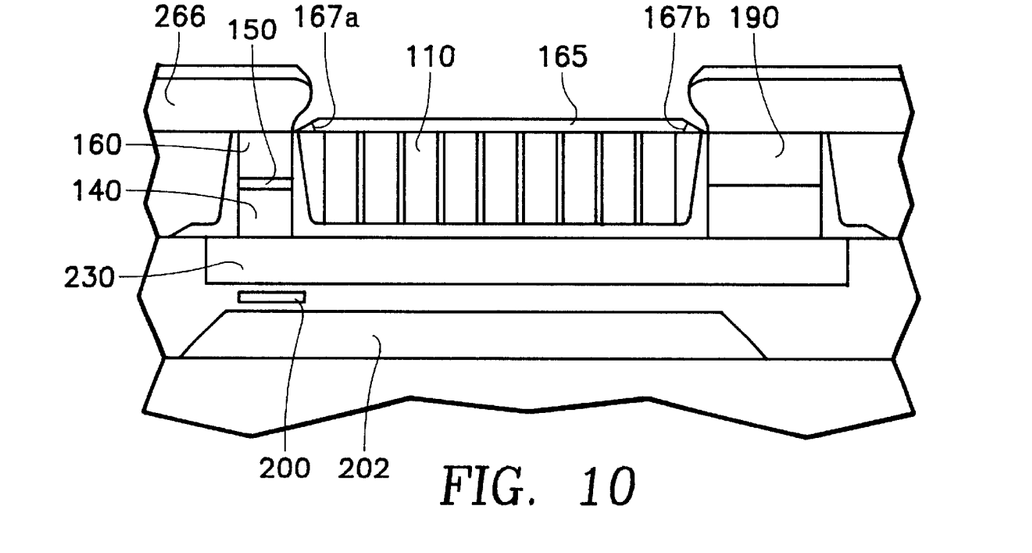
FIG. 10 is a cross-sectional side view of a partially fabricated thin film merged head in accordance with the present invention.

Referring to FIG. 10, with the preferred method of the present invention, a bilayer resist pattern is used to form the capping layer 165 on the planarized coil 165. Preferably, the resist pattern 266 is located so that the capping layer 165 does not cover the top surfaces of the upper pedestal pole tip 160 or the back gap 190. It is preferred to form the bilayer resist structure 266 and so that the capping layer 165 provides low apex angles 167a & 167b of less than about 30 degrees. Also, it is preferred to form the capping layer thin to provide reduced yoke height and to facilitate low apex angles 167a & 167b and to minimize the length of the sloping surface formed by the apex angles 167a & 167b. This improves the performance of high moment materials, which do not perform well when sputtered on steep sloping surfaces.

As such, although in some embodiments of the present invention it is possible to use an organic insulation, such as cured photoresist, to form the capping insulation layer 165, in the preferred embodiments, an inorganic insulation, such as alumina, $SiO_2$ or the like, are used to form capping insulation layer 165. In one preferred embodiment, the capping layer is formed about a quarter of a micron thick. The bilayer resist structure 266 may be removed using a lift off process.

Figure 11:
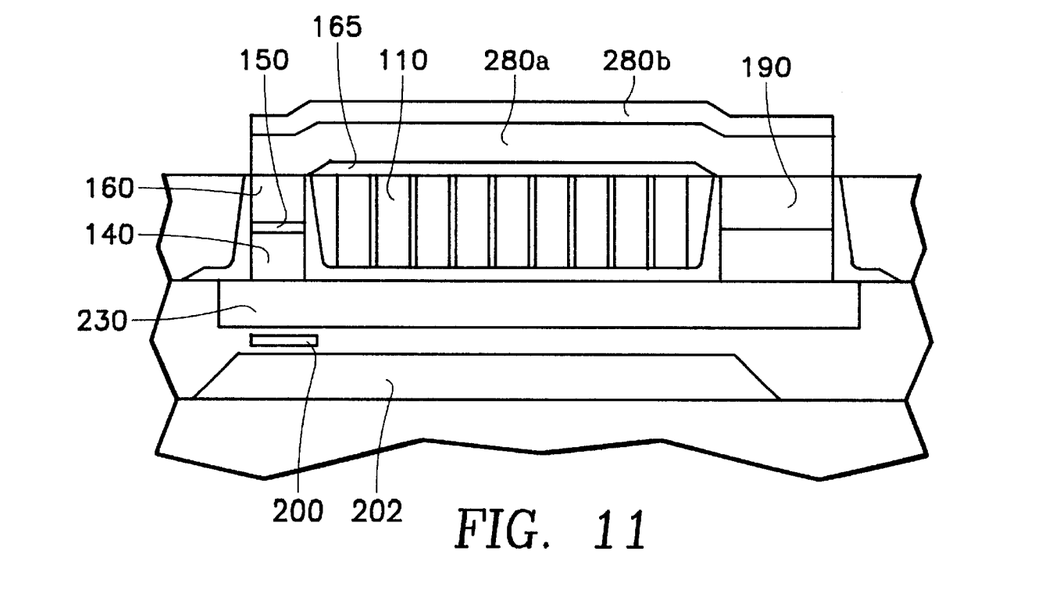
FIG. 11 is a cross-sectional side view of a partially fabricated thin film merged head in accordance with the present invention.

Turning to FIG. 11, in the preferred method of the present invention, a first layer of upper yoke material 280a is deposited over the existing structures. A difficulty of using FeXN for the upper yoke is that it can not be deposited by plating, only by sputtering. This is an impediment to defining small upper yoke widths, which is desirable in some embodiments, particularly near or at the yoke-to-pedestal pole stitch. To overcome this, the first layer 280a of upper yoke material is deposited without using a photoresist mask to define the final structure of the yoke. Instead, a photoresist mask, not shown, is formed on the first layer 280a, and a second layer 280b is deposited within the mask. The mask is then removed and the first layer 280a is etched using the second layer 280b as a hard mask to define the structure of the yoke from the first layer 280a.

It should be noted that a portion of the second yoke layer 280b will be etched during the etching of the first yoke layer 280a. As such, sufficient material should be deposited so that the second yoke layer 280b is not entirely removed during the etch process. With the preferred method about one micron of high Bat NiFe, with about 55% Fe, is plated within the resist mask which is formed on about two microns of high moment FeXN sputtered material. Dry etching, such as ion milling, is preferred to define the yoke structure from the first yoke layer 280a.

Laminating the yoke 180 and using high $B_{sat}$ magnetic material as a hard mask to define first yoke layer 180a allows greater process control, thus allowing the geometry of the yoke 180 to be reduced. The thickness of the FeXN of the first yoke layer may be reduced because the hard mask of the preferred embodiment provides additional flux carrying capabilities. As such, a thinner photoresist mask may be used to form the upper layer than otherwise would be required to define a thicker single layer FeXN yoke. As such, etch selectivity is improved.

In the preferred embodiments, high moment FeXN is used for the first yoke layer, where X may be Rh, Al, Ta, Zr, Ti, Hf; Cr, V, Nb, Mo, Si, or other similar material as is known in the art. In one embodiment FeXN may be formed as disclosed in U.S. patent application Ser. No. 09/315,863, by Chen et al., entitled HIGH RESISTIVITY FeXN SPUTTERED FILMS FOR MAGNETIC STORAGE DEVICES AND METHOD OF FABRICATION, filed on May 20, 1999, herein incorporated by reference in its entirety.

Figure 12:
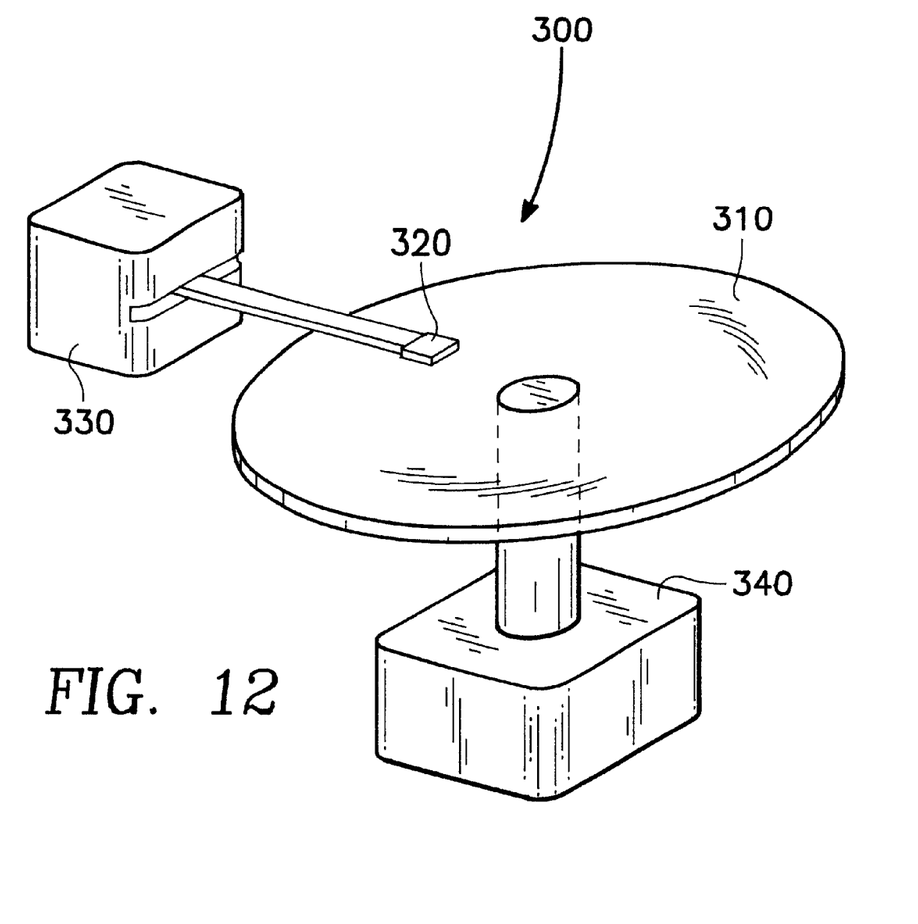
FIG. 12 is an isometric view illustrating a data storage and retrieval apparatus employing an improved thin film write head in accordance with the present invention.

Embodiments of the present invention may be employed to provide an improved data storage and retrieval apparatus as conceptually depicted in FIG. 12. FIG. 12 shows a thin film write head embodied in a disk type magnetic data storage and retrieval apparatus 300. The write head of the present invention may be located within a merged head assembly 320 which rides above a magnetic storage media 310, depicted in FIG. 12 as a rotatable hard disk type storage media. The hard disk 310 is coupled to a motor 340 to provide rotation of the disk relative to the head assembly 320. An actuating means 330 may be used to position the head assembly 320 above the surface of the media 310 to read and write data in the form of magnetic bits from and to the media 310. The data storage and retrieval apparatus 300, typically has several hard disks 310 and several corresponding head assemblies 320. The improved structure of the present invention is intended to be utilized in all known data storage and retrieval apparatuses. By way of non-exclusive example, the present invention is also intended to improve magnetic tape or stripe type storage and retrieval apparatuses, or any other known types of magnetic storage and retrieval apparatuses.

While the preferred embodiments and methods of the present invention have been described in detail above, many changes to these embodiments and methods may be made without departing from the true scope and teachings of the present invention. The present invention, therefore, is limited only as claimed below and the equivalents thereof.

What we claim is:

1. A thin film write head comprising:
   a) a lower pole structure having a pedestal pole tip comprising CoNiFe;

b) an upper pole structure comprising;
  (i) a pedestal pole tip comprising CoNiFe; and
  (ii) a yoke portion comprising:
    (1) a lower layer stitched to the pedestal pole tip of the upper pole structure comprising FeXN, where X is selected from the group consisting of Rh, Ta, Hf, Al, Zr Ti, Ru, Si, Cr, V, Si, Sr, Nb, Mo, Ru, and Pd; and
    (2) an upper layer comprising NiFe; and
c) a write gap between the pedestal pole tip of the upper pole structure and the pedestal pole tip of the lower pole structure.

2. The thin film write head of claim 1 wherein the pedestal pole tip of the upper pole structure and the pedestal pole tip of the lower pole structure both comprise from about 60% to about 70% Co and from about 10% to about 15% Ni.

3. The thin film write head of claim 2 wherein the upper layer of the yoke comprises from about 15% to about 55% of Fe.

4. The thin film write head of claim 1 wherein the lower layer of the yoke is formed using the upper layer as a hard mask.

5. The thin film write head of claim 4 further comprising a winding having a conductor coil with a top surface, and wherein the pedestal pole tip of the upper pole structure has a top surface, and wherein the top surface of the conductor coil and the top surface of the pedestal pole tip of the upper pole structure are generally even.

6. The thin film write head of claim 5 further comprising an inorganic capping layer over the coil.

7. The thin film write head of claim 6 wherein the upper yoke is formed on the capping layer.

8. A data storage and retrieval apparatus comprising:
a) a magnetic recording media;
b) a merged head assembly positioned adjacent the magnetic recording media comprising:
  (i) a read sensor; and
  (ii) a write head comprising:
    (1) upper and lower pedestal pole tips each comprising CoNiFe, said upper and lower pedestal pole tips having a write gap therebetween;
    (2) a laminated upper yoke structure comprising lower and upper layers, the lower layer being stitched to the upper pedestal pole and comprising FeXN, where X is selected from the group consisting of Rh, Ta, Hf; Al, Zr, Ti, Ru, Si, Cr, V, Si, Sr, Nb, Mo, Ru, and Pd, the upper layer comprising NiFe; and
    (3) a conductor winding disposed behind the upper and lower pedestal pole tips for generating flux across the write gap; and
c) a motor coupled to the media so as to move the media with respect to the head assembly.

9. The data storage and retrieval apparatus of claim 8 wherein the upper and lower pedestal pole tips comprise CoNiFe with from about 60% to about 70% Co and from about 10% to about 15% Ni.

10. The data storage and retrieval apparatus of claim 9 wherein the upper layer of the yoke comprises from about 15% to about 55% of Fe.

11. The data storage and retrieval apparatus of claim 10 wherein the lower layer of the yoke is formed using the upper layer as a hard mask.

* * * * *

UNITED STATES PATENT AND TRADEMARK OFFICE
CERTIFICATE OF CORRECTION

PATENT NO. : 6,353,511 B1
DATED : March 5, 2002
INVENTOR(S) : Shi et al.

It is certified that error appears in the above-identified patent and that said Letters Patent is hereby corrected as shown below:

Column 4,
Line 61, replace "As", with -- $\lambda_s$ --;

Column 6,
Line 11, replace "Bat", with -- $B_{sat}$ --.

Signed and Sealed this

Twenty-fifth Day of February, 2003

JAMES E. ROGAN
*Director of the United States Patent and Trademark Office*